United States Patent [19]

Paul et al.

[11] Patent Number: 5,229,486

[45] Date of Patent: Jul. 20, 1993

[54] PROCESS FOR ISOLATING POLYMERS FROM THEIR SOLVENTS USING LIQUIDS CONTAINING CARBON DIOXIDE

[75] Inventors: Hanns-Ingolf Paul; Rolf Treckmann, both of Cologne; Günther Weymans; Jürgen Kirsch, both of Leverkusen; Jürgen Heuser, Krefeld; Klaus Elgeti, Bergisch Gladbach, all of Fed. Rep. of Germany

[73] Assignee: Bayer Aktiengesellschaft, Leverkusen Bayerwerk, Fed. Rep. of Germany

[21] Appl. No.: 805,424

[22] Filed: Dec. 11, 1991

[30] Foreign Application Priority Data

Dec. 20, 1990 [DE] Fed. Rep. of Germany ....... 4040855
Jun. 4, 1991 [DE] Fed. Rep. of Germany ....... 4118230

[51] Int. Cl.$^5$ ............................................. C08G 63/91
[52] U.S. Cl. ........................................ 528/483; 528/480; 528/491; 528/497
[58] Field of Search ............... 528/483, 196, 481, 487, 528/491, 497, 498, 480; 525/439

[56] References Cited

U.S. PATENT DOCUMENTS

| | | | |
|---|---|---|---|
| 4,634,761 | 1/1987 | Mendiratta et al. | 528/500 |
| 4,649,162 | 3/1987 | Roche et al. | 521/78 |
| 4,918,160 | 4/1990 | Kondoh et al. | 528/483 |
| 4,990,595 | 2/1991 | Traechkner et al. | 528/483 |

FOREIGN PATENT DOCUMENTS

| | | |
|---|---|---|
| 184935 | 9/1986 | European Pat. Off. . |
| 3840293 | 5/1990 | Fed. Rep. of Germany . |
| 1168730 | 7/1989 | Japan . |

OTHER PUBLICATIONS

Macromolecules, 18, Apr. 1, 1985, McHugh, "Separating Polymer Solutions with Supercritical Fluids".
Article by Yamamoto, Koji in; Kagaku Kogaku 53 (12), 1989, pp. 914–916.
Article by Yamamoto Koji et al. in: Kagaku Kogaku Ronbunshu 15 (3), 1989, pp. 673–675.
Article by Beckmann and Porter, Polym. Sci. Part B: Polym. Phys. 25 (7), pp. 1511–1517, 1987.

Primary Examiner—John Kight, III
Assistant Examiner—Shelley A. Dodson
Attorney, Agent, or Firm—Joseph C. Gil; Aron Preis

[57] ABSTRACT

A process for isolating polymers from their solvents by addition of fluids containing carbon dioxide at temperatures of 30° to 280° C. and under pressures of 1 to 1,000 bar is disclosed. The process is characterized in that the concentration of the polymers in their solvents is between 5% and 80% by weight and the fluid containing carbon dioxide consists of at least 50% by weight carbon dioxide.

7 Claims, 1 Drawing Sheet

PROCESS FOR ISOLATING POLYMERS FROM THEIR SOLVENTS USING LIQUIDS CONTAINING CARBON DIOXIDE

The isolation of polymers from organic solvents is an important process step. In general, 5 to 80% polymer solutions have to be separated in such a way that any aftertreatment of the isolated polymer, for example by residual evaporation or residual drying, can be carried out quickly and simply without any damage to the product.

There has been no shortage of attempts to remove polymer solutions from their organic solvents by various precipitation processes.

Thus, according to U.S. Pat. No. 4,634,761 for example, polymers can be isolated from organic solvents by stirring the organic solution into an aqueous solution, specially adjusting the inflow of aqueous and organic phase and volatilizing the organic solvent in the mixture in such a way that polymer agglomerates suitable for subsequent processing are precipitated. This process has the disadvantage that subsequent drying of the agglomerates is expensive on account of the residual water content.

It is also known that residual impurities can be removed from polymers by means of supercritical fluids.

According to EP 334 314 A2, impurities, such as solvent residues, additives, monomers and oligomers, can be isolated from polymers by an entraining gas, such as carbon dioxide, at temperatures between 30° C. and 120° C. and under pressures above 10 bar. However, this process can only be applied when the treated polymers have already been substantially isolated from the organic solvents.

A process for the removal of methylene chloride from polycarbonate with supercritical carbon dioxide is described in the Article by Yamamoto, Koji in: Kagaku Kogaku 53(12), 1989, pages 914 to 916. More particularly, it is explained how the methylene chloride diffuses as a function of the pressure and the temperature of the supercritical fluid-containing system. However, there are no references to the special working up according to the present invention.

DE 3 840 293 A1 describes a process for the removal of impurities from polymeric plastics and to an apparatus for carrying out the process. This known process is based on working up using special screw technology for polymer melts.

JP 0 116 8730-A2 describes a process with which polycarbonate is freed from solvent residues with supercritical carbon dioxide under pressures of 70 to 500 bar and at temperatures of 3° to 300° C. Once again, the process can only be applied after the polymer has already been substantially isolated from the organic solvent.

The residual isolation of methylene chloride from polycarbonate with carbon dioxide in a fixed bed is described in the Article by Yamamoto Koji et al in: Kagaku Kogaku Ronbunshu 15(3), 1989, pages 673–675.

According to the Article by Beckmann and Porter in: J. Polym. Sci. Part B: Polym. Phys. 25(7), pages 1511–1517, 1987, polycarbonate can be made to crystallize very easily where polycarbonate which has already been substantially isolated (polycarbonate solid) and supercritical carbon dioxide are used.

In applicants' view, the process according to the present invention is neither covered by nor can be logically derived from the prior art.

Figure 1:
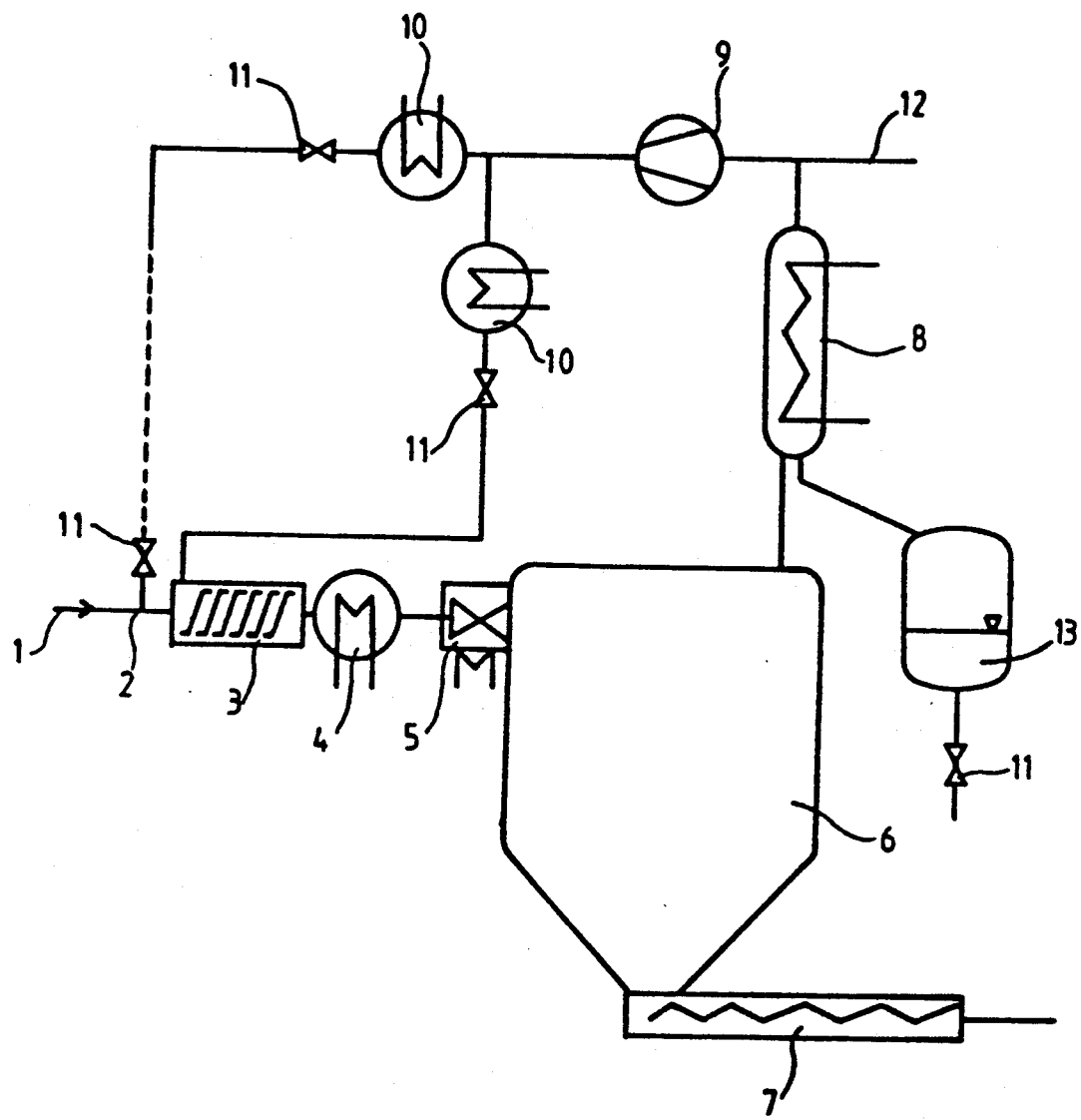
FIG. 1 illustrates an embodiment of the isolation process of the invention relating to polycarbonate/methylene chloride solutions.

The present invention relates to a process for isolating polymers from their solvents by addition of fluids containing carbon dioxide at temperatures of 30° C. to 280° C. under pressures of 1 bar to 1,000 bar, characterized in that the concentration of the polymers in their solvents is between 5% by weight and 80% by weight and the fluid containing carbon dioxide consists of at least 50% by weight carbon dioxide.

Any polymers which are present in their solvents or which accumulate as solutions during their production are generally suitable. Thus, suitable polymers are polymers from the classes of polycarbonates, polyolefins, polystyrenes, polyhalo-olefins, polyvinyls, polyethers, polyacrylates, polyalkyl methacrylates, polydienes, polyesters, polyester carbonates, polyamides or polyarylenes, such as for example polyarylene sulfides, polyarylene ketones and polyarylene sulfones, and polyimides, polyether esters and polysiloxanes. Conductive polymers and polyelectrolytes are also suitable.

The polymers may be both copolymers and homopolymers; the copolymers may be both block and statistical copolymers. The polymers have typical molecular weights, for example, molecular weights between 10,000 g/mol and 500,000 g/mol, molecular weight distributions and non-uniformities and may still contain oligomers and branched or crosslinked components in typical quantities, for example, up to 10% of total weight.

Of these polymers, preference is attributed to polyester carbonates based on diphenols, terephthalic and/or isophthalic acid, carbonic acid, chain terminators and, optionally, branching agents, in which the ratio of carbonate structures to aromatic dicarboxylic acid ester structures is between 10 mol-%:90 mol-% and 40 mol-%:60 mol-%, based on the total mols of carbonate and dicarboxylic acid ester structures. Polyester carbonates such as these are described, for example, in EP-OS 0 036 080.

Aliphatic thermoplastic polyesters are also preferred, polyalkylene terephthalates being particularly preferred. Polyalkylene terephthalates are, for example, polyalkylene terephthalates based on ethylene glycol, propane-1,3-diol, butane-1,4-diol, hexane-1,6-diol and 1,4-bis-hydroxymethyl cyclohexane (see for example U.S. Pat. Nos. 2,647,885, 2,643,989, 2,534,028, 2,578,660, 2,742,494 and 2,901,466).

Other preferred polymers are thermoplastics polyalkyl (meth)acrylates, more particularly poly-$C_{1-4}$-alkyl methacrylates, i.e. for example polymers of methyl, ethyl, propyl or butyl methacrylate. By polymers are meant both homopolymers and copolymers of these methacrylates.

Other suitable polymers are linear and branched polyarylene sulfides containing structural units corresponding to the general formula (-Ar-S-)n, in which Ar- is an aromatic constituent which may include up to 4 substituents and preferably at most two substituents and n is an integer of 10 to 1,000. Unsubstituted p-phenylene sulfides are particularly suitable (see for example U.S.

Pat. No. 3,354,129 and EP-OS 0 171 021 and the literature cited in EP-OS 0 171 021).

Other preferred polymers are polyphenylene oxides, more particularly poly(2,4-dialkyl-1,4-phenylene oxides), such as those described for example in DE-OS 2 126 434 or in U.S. Pat. No. 3,306,875.

Preferred polymers for the process according to the invention are, in particular, aromatic polycarbonates based on diphenols. Polycarbonates such as these are known from the literature. Suitable diphenols are described in U.S. Pat. Nos. 3,028,365, 2,999,835, 3,148,172, 3,275,601, 2,991,273, 3,271,367, 3,962,781, 2,970,131 and 2,999,846, in DE-OSS 1 570 703, 2 063 050, 2 063 052, 22 110 956, in FR-PS 1 561 518 and in DE-OSS 3 832 396 (Le A 26 344) and 3 833 953 (Le A 26 397).

Particularly preferred diphenols are 4,4'-dihydroxydiphenyl, 2,2-bis-(4-hydroxyphenyl)-propane, 2,2-bis-(3,5-dimethyl-4-hydroxyphenyl)-propane and 1,1-bis-(4-hydroxyphenyl)-3,3,5-trimethyl cyclohexane.

The polycarbonates preferably have molecular weights $M_w$ (weight average, as determined by scattered light measurement) in the range from 15,000 to 200,000 g/mol and more particularly in the range from 20,000 to 80,000 g/mol.

Of these polycarbonates, which may also be copolycarbonates based on the diphenols mentioned, polycarbonates and copolycarbonates based on 2,2-bis-(4-hydroxyphenyl)-propane with chain terminators p-tert. butyl phenol, cumyl phenol, phenol and isooctyl phenol, copolycarbonates of 2,2-bis-(4-hydroxyphenyl)-propane with 2,2-bis-(3,5-dimethyl-4-hydroxyphenyl)-propane and copolycarbonates of 2,2-bis-(4-hydroxyphenyl)-propane with 1,1-bis-(4-hydroxyphenyl)-3,3,5-trimethyl cyclohexane are particularly suitable.

The process according to the invention may be used with particular advantage for isolating the polycarbonates described as particularly preferred.

The polymers are present in their respective inert organic solvents. The expert knows which organic liquid in which temperature range is a solvent for which polymer.

The process according to the invention for isolating polymers may be applied where the polymers have to be isolated from organic solvents in which they are present in concentrations of 5 to 80% by weight polymer, based on the weight of the polymer/solvent mixture. The polymer solutions preferably contain between 10 and 60% by weight and, more preferably, between 14 and 26% by weight polymer. Suitable organic solvents which are inert to the particular polymer are, in general, organic compounds which are capable of dissolving the particular polymer at temperatures below 240° C.

Accordingly, suitable solvents for polycarbonates are, for example, methylene chloride, monochlorobenzene, acetone, acetonitrile and mixtures of these solvents, more particularly solvent mixtures of methylene chloride and chlorobenzene and also methylene chloride and chlorobenzene alone.

Solvents suitable for polyphenylene sulfides are, for example, N-methyl pyrrolidone and N-methyl caprolactam.

Fluids containing carbon dioxide suitable for the purposes of the invention are fluids which contain at least 50% by weight, based on the total weight of liquid, of pure carbon dioxide. These liquids containing at least 50% by weight carbon dioxide are particularly suitable when the respective constituents of the fluids making up the balance to 100% by weight are gases or gas mixtures which have critical temperatures below 200° C. and critical pressures below 200 bar. Accordingly, gases such as these are, in particular, dinitrogen oxide, methane, nitrogen, propane, difluorochloromethane, trifluoromethane, ethane, ammonia, sulfur hexafluoride and/or sulfur dioxide.

The following are preferably added to the carbon dioxide: sulfur dioxide, propane, nitrogen, ethane, ammonia and/or trifluoromethane. In a particularly preferred embodiment, no more than 30% by weight and, in particular, no more than 10% by weight, based on the total weight of fluid used, of fluids other than carbon dioxide are used. It is preferred above all to use substantially pure carbon dioxide.

The temperature range in which it is favorable to add the fluid containing carbon dioxide to the polymer solution depends upon the polymer and its particular solvent and upon the concentration of the polymer in the solvent. A temperature range in which preferably 10% by weight and, more preferably, at least 14% by weight of the particular polymer is dissolved in the solvent is generally selected. The polymer concentrations should be below 80% by weight, preferably below 60% by weight and, more preferably, between 14 and 26% by weight. Accordingly, typical temperatures are between 30° C. and 280° C. and preferably between 30° C. and 100° C. and typical pressures are in the range from 1 bar to 1,000 bar and preferably in the range from 10 bar to 500 bar. It can be of advantage to work in the region of the critical temperature and the critical pressure of the particular carbon-dioxide-containing fluid.

The quantities of fluid to be used in accordance with the invention depend upon the concentration of the polymer to be isolated in its organic solvent. Typical concentrations are 5 to 5000% by weight carbon-dioxide-containing fluid according to the invention, based on the total weight of polymer and organic solvent.

The fluid containing carbon dioxide is added by mixing. This may be done continuously or discontinuously. Suitable mixers are stirred tanks, autoclaves, mixing elements, such as for example static mixers of the BKM type, twin-fluid nozzles having a residence time and mixing time of at least 20 milliseconds, such as for example solid cone nozzles, hollow cone eccentric nozzles, axial hollow cone nozzles and pneumatic spray nozzles. It can be of advantage to hold the pressure for a certain time after mixing rather than releasing it immediately after mixing. Typical residence times are between 0,1 and 100 seconds and preferably more than 1 second. The polymer precipitates from its organic solvent during or after mixing. The solution is expanded thereafter (after a residence time of at least 20 milliseconds) or even during the precipitation process by reducing the pressure, for example by expansion into a container or by atomization.

Suitable temperatures for the expansion step are, in particular, temperatures in the vicinity of the boiling point of the polymer solvent, so that the fluid containing carbon dioxide volatilizes together with the organic solvent during degassing.

The process according to the invention is described by way of example in the following with reference to the isolation of polycarbonate from methylene chloride:

The polycarbonate solution, for example between 14 and 26% by weight in pure methylene chloride, is initially introduced into a stirred tank under pressures of 1 to 3 bar and at temperatures of 20° to 80° C. Fluid containing carbon dioxide is then introduced into the stirred tank with continuous stirring until an increase in pressure of at least 60 bar is observed. With continued stirring and with continued addition of fluid containing carbon dioxide, polymer solution may then be continuously expanded through an outlet in the bottom of the stirred tank without any reduction in the internal pressure of the stirred tank.

It can be of particular advantage initially to stir a certain quantity, for example 25%, based on the quantity of polymer and solvent, of fluid containing carbon dioxide into the polycarbonate solution either in a stirred tank or in any other mixer. The quantity is selected so that the polycarbonate still does not precipitate from the organic solution. More fluid containing carbon dioxide is then added to the organic polycarbonate solution in a twin-fluid nozzle under pressures of 80 to 250 bar, followed by expansion in a separation vessel. Instead of using a twin-fluid nozzle as the mixing and expansion unit, it is also possible to use a nozzle with no mixing function as the expansion unit and a static mixer, for example of the BKM type, as the mixing unit.

An isolation process of the type described above carried out specifically for polycarbonate/methylene chloride solutions using the process according to the invention is illustrated in FIG. 1. The polycarbonate/methylene chloride solution coming from (1) is optionally pretreated in a mixer M1 (2) with fluid containing carbon dioxide in such quantities that polycarbonate does not precipitate. Another 5 to 500% by weight fluid are then added via a static mixer M2 (3) under pressures of 80 to 300 bar. The three-component system of polycarbonate, methylene chloride and fluid is then heated to temperatures of 60° to 80° C. in the preheater W1 (4) and expanded through a nozzle with no mixing function (one-fluid nozzle) D1 (5) into a separation vessel AB (6) in which pressures of 1 to 10 bar prevail. The polycarbonate powder formed during expansion and atomization may be discharged, for example, through a screw AS (7) at the bottom of the separator AB (6). It can also be of advantage to use a fluidized bed at the bottom of the separator which back-mixes polycarbonate already low in methylene chloride with the polycarbonate powder relatively rich in methylene chloride which is still present in the separator and thus enables the particle size of the powder to be varied. The nozzle D1 (5) is optionally heated to avoid reductions in temperature during expansion. The methylene chloride escapes from the separator together with the carbon dioxide and is fed to the condenser KO (8) in which the solvent condenses and the fluid containing carbon dioxide is separated and returned to the process (for example via the compressor KP (9), the heater WÜ (10) and the valve VE (11)). As already mentioned, the static mixer M2 (3) and the one-fluid nozzle D1 (5) may be replaced by a twin-fluid nozzle. It can also be of advantage to use a static mixer as the mixing unit M1 (2). In addition, a residence time of 20 milliseconds to 10 seconds between introduction of the fluid containing carbon dioxide and expansion in a nozzle may be necessary to optimize the particle size of the powder.

Additional explanations of FIG. 1:

KO (8) has a pressure of 2 to 50 bar; (12) is a $CO_2$ replenishing facility, (13) is solvent

EXAMPLES a) General procedure 600 ml of a 20% by weight polycarbonate/methylene chloride solution are initially introduced into a 1,000 ml capacity autoclave equipped with a stirrer and a bottom outlet. The polycarbonate has a relative viscosity, as measured by gel permeation chromatography at 25° C. and at a polymer concentration of 5 g/liter in methylene chloride, of 1.28. The polymer solution is initially introduced at room temperature. An initial pressure of 10 bar is built up in the autoclave by addition of carbon dioxide and the carbon dioxide is mixed in for 3 minutes at a stirring speed of 400 r.p.m. The bottom outlet is then opened, forcing the polycarbonate/methylene chloride/carbon dioxide solution into a pipe having an internal diameter of 5 mm. The pipe is heated to around 60° C. After a length of about 50 cm, it terminates in a twin-fluid nozzle into which carbon dioxide at 80° C. is introduced under a pressure of 100 bar and expanded into a separation vessel (pressure in the separation vessel: 1 bar). The polycarbonate powder accumulating at the bottom of the vessel is inspected.

b) Test parameters

EXAMPLE 1

Nozzle used: mixing nozzle with jet mixing, exit from inner part at same level as exit from jacket, mixing outside the nozzle Initial pressure in autoclave: 10 bar Carbon dioxide pressure: 100 bar The 20% polycarbonate solution is introduced into the jacket space of the nozzle while the carbon dioxide is introduced into the inner space. The feed pipe from the carbon dioxide reservoir to the nozzle is heated to 60° C.

EXAMPLE 2

Nozzle used: mixing nozzle with internal mixing, otherwise as Example 1. The carbon dioxide and the polycarbonate solution are combined in the nozzle and mixed by means of a static mixer. The initial pressure in the polycarbonate storage vessel is 20 bar.

EXAMPLE 3

As Example 1, except that the carbon dioxide is first passed through the nozzle and the polycarbonate solution is then added. Initial pressure in the storage vessel: 20 bar.

EXAMPLE 4

A nozzle with jet mixing is used as the mixing nozzle. The polycarbonate is introduced into the inner space of the nozzle while the carbon dioxide is introduced into the jacket space. The nozzle orifice is removed from the outlet of the inner part by means of a check nut. Mixing takes place inside the nozzle. Initial pressure in the storage vessel: 20 bar, otherwise as Example 1.

EXAMPLE 5

As Example 1, except that the carbon dioxide is mixed in under a pressure of 200 bar.

EXAMPLE 6

As Example 1, except that a mixture of carbon dioxide and nitrogen (composition: 70% by weight carbon dioxide, 30% by weight nitrogen) is mixed in at 80° C./300 bar.

c) Evaluation of the isolating effect

Differential scanning calorimetry and thermogravimetry measurements were carried out on all the samples in the separation vessel. All the samples had a granular structure and were free-flowing.

Residual methylene chloride content:

| Example 1: | <1% |
|---|---|
| Example 2: | 3% |
| Example 3: | 3% |
| Example 4: | <1% |
| Example 5: | <1% |
| Example 6: | <1% |

The polycarbonate powders thus obtained can be residually degassed in known manner, for example in a degassing screw, and processed to granules.

d) Comparison Example

Pure nitrogen having a critical temperature below −140° C. and a critical pressure of about 34 bar was introduced as fluid into the nozzle of Example 1 at a temperature of 60° C. and under a pressure of 300 bar. The polymer product in the separation vessel was speckled, did not have a good consistency and still contained more than 10% by weight methylene chloride.

What is claimed is:

1. A process for isolating a polymer from a solution containing a polymer and its solvent comprising
   (i) mixing into said solution a fluid containing carbon dioxide at temperatures between 30° and 100° C. and under pressures of 1 to 1,000 bar, causing precipitation of said polymer, and
   (ii) collecting said polymer, and
   (iii) granulating said polymer,
said solution containing said polymer at an amount of 5 to 80% by weight, said fluid containing at least 50% by weight carbon dioxide.

2. The process of claim 1 wherein mixing is carried out in a static mixer.

3. The process of claim 1 further comprising expanding said solution during or after said mixing through a nozzle into a container or by atomization.

4. The process of claim 1 characterized in that said fluid is mixed with said solution in a twin-fluid nozzle at a weight-ratio of fluid to polymer solution selected to cause said precipitation within the twin-fluid nozzle.

5. The process of claim 1 wherein said polymer is polycarbonate and said solvent is at least one member selected from the group consisting of chlorobenzene and methylene chloride.

6. The process of claim 3 characterized in that a residence time of at least one second is interposed between said mixing and said expansion.

7. The process of claim 2 characterized in that 25% by weight, based on the quantity of polymer and solvent, of fluid is added to the polymer solution before said solution is introduced to said static mixer.

* * * * *